Patented Aug. 27, 1946

2,406,630

UNITED STATES PATENT OFFICE 2,406,630

PRODUCTION OF CYCLO-OLEFINIC HYDROCARBONS AND AROMATIC HYDROCARBONS

Herman Pines and Vladimir N. Ipatieff, Chicago, Ill., assignors to Universal Oil Products Company, Chicago, Ill., a corporation of Delaware No Drawing. Application December 15, 1944, Serial No. 568,390

8 Claims. (Cl. 260—666)

This invention relates to a process for producing cyclic hydrocarbons. More specifically, the invention relates to a process for producing cyclo-olefins by condensing a glycol of at least 4 carbon atoms with an olefin.

An object of this invention is the condensation of an olefinic hydrocarbon with a glycol containing at least 4 carbon atoms per molecule.

Another object of this invention is the production of a cyclohexene hydrocarbon by condensing a mono-olefinic hydrocarbon with a glycol containing at least 4 carbon atoms per molecule.

A further object of this invention is the production of 1,3,5-trimethylcyclohexene by condensing 2-methyl-2,4-pentanediol with propylene.

One specific embodiment of this invention relates to a process for producing a cyclo-olefin which comprises condensing an aliphatic mono-olefin and a glycol having at least 4 carbon atoms per molecule in the presence of an acid-acting catalyst at a temperature of from about 150° to about 400° C. The reaction is preferably carried out at pressures from about 1 to about 100 atmospheres.

A further embodiment of this invention relates to a process for producing a benzene hydrocarbon which comprises condensing a mono-olefinic hydrocarbon and a glycol containing at least 4 carbon atoms per molecule in the presence of an acid-acting catalyst to produce a cyclohexene hydrocarbon, hydrogenating said cyclohexene hydrocarbon to a cyclohexane hydrocarbon, dehydrogenating the latter hydrocarbon to a benzene hydrocarbon and hydrogen, and utilizing at least a portion of said hydrogen in the hydrogenation of said cyclohexene hydrocarbon.

Cyclohexene and different alkyl cyclohexene hydrocarbons which are obtainable by the process of our invention may be hydrogenated to cyclohexane hydrocarbons, or be dehydrogenated to benzene and alkylated benzene hydrocarbons.

By the term "condensation" used in this specification and in the claims, we mean the chemical combination of a dihydric alcohol having at least 4 carbon atoms per molecule and a mono-olefinic hydrocarbon accompanied by the splitting out of water. Thus, we have found that 2-methyl-2,4-pentanediol and ethylene react at an elevated temperature in the presence of an acid-acting catalyst to produce 1,3-dimethylcyclohexene and water as the condensation products.

Glycols, also known as dihydric alcohols, utilizable in our process contain at least 4 carbon atoms per molecule and have two hydroxyl groups, these groups being preferable in the beta, gamma, and delta positions to each other. Also cyclic glycols such as 1,3- and 1,4-cyclohexanediols are utilizable in our process. Olefinic alcohols or partially dehydrated glycols such as 4-methyl-4-pentene-2-ol are also useful raw materials for our condensation process.

Catalysts utilizable in our process for condensing a dihydric alcohol with an olefin are acid-acting materials and comprise Activated Alumina, hydrated silica, acid-treated clays, synthetically prepared composites comprising silica-alumina, silica-alumina-zirconia, alumina-zirconia, silica-alumina-thoria; acids such as hydrochloric acid, hydrobromic acid, a phosphoric acid, sulfuric acid, a heteropoly acid as phosphomolybdic or phosphotungstic acid, etc.; and also hydrolyzable salts such as magnesium chloride, ammonium chloride, ferric chloride, etc. These materials utilizable as catalysts in our process are acid-acting in the sense that an aqueous solution or a suspension thereof in water has a pH below 7.

Our process may be carried out using either batch or continuous types of operation, although the latter is preferable. The process is carried out at a temperature of from about 150° to about 400° C. but preferably at a temperature of from about 150° to about 275° C. Superatmospheric pressures are recommended but this pressure is generally not in excess of about 100 atmospheres.

The following example is given to illustrate the character of results obtainable by the process of our invention although the example is not introduced with the intention of unduly restricting the broad scope of the invention.

1.5 molecular proportions of propylene and 1 molecular proportion of 2-methyl-2,4-pentanediol are mixed and introduced to an autoclave containing a 5% solution of magnesium chloride in water. The volume of the magnesium chloride solution is approximately equal to that of the reaction mixture introduced thereto. The entire reaction mixture is heated at about 250° C. for about 2 hours. After cooling, the reaction mixture yields a hydrocarbon layer containing about 35% of normally liquid hydrocarbon material comprising essentially 1,3,5-trimethylcyclohexene. This trimethylcyclohexene is convertible by dehydrogenation into mesitylene.

The novelty and utility of the process of the present invention are evident from the preceding specification and example, although neither section is introduced to limit unduly the broad scope of our invention.

We claim as our invention:

1. A process for producing a cyclo-olefinic hydrocarbon which comprises reacting a glycol having at least 4 carbon atoms per molecule and a mono-olefinic hydrocarbon in the presence of an acid-acting catalyst at a sufficient temperature and pressure that condensation of said mono-olefinic hydrocarbon and glycol is the principal reaction of the process.

2. A process for producing a cyclo-olefinic hydrocarbon which comprises reacting a glycol having at least 4 carbon atoms per molecule and a mono-olefinic hydrocarbon in the presence of an acid-acting catalyst at a temperature of from about 150° to about 400° C.

3. A process for producing a cyclo-olefinic hydrocarbon which comprises reacting a glycol having at least 4 carbon atoms per molecule and a mono-olefinic hydrocarbon in the presence of an acid-acting catalyst at a temperature of from about 150° to about 400° C. and at a pressure of from about 1 to about 100 atmospheres.

4. A process for producing a cyclo-olefinic hydrocarbon which comprises reacting more than 1 molecular proportion of a mono-olefinic hydrocarbon and 1 molecular proportion of a glycol having at least 4 carbon atoms per molecule in the presence of an acid-acting catalyst at a temperature of from about 150° to about 400° C. and at a pressure of from about 1 to about 100 atmospheres.

5. A process for producing 1,3,5-trimethylcyclohexene which comprises reacting 2-methyl-2,4-pentanediol and propylene in the presence of an aqueous solution of a hydrolyzable metal salt at a temperature of from about 150° to about 400° C.

6. A process for producing 1,3,5-trimethylcyclohexene which comprises reacting 2-methyl-2,4-pentanediol and propylene in the presence of an aqueous solution of a hydrolyzable metal salt at a temperature of from about 150° to about 400° C. and at a pressure of from about 1 to about 100 atmospheres.

7. A process for producing a benzene hydrocarbon which comprises reacting a mono-olefinic hydrocarbon and a glycol containing at least 4 carbon atoms per molecule in the presence of an acid-acting catalyst to produce a cyclohexene hydrocarbon, hydrogenating said cyclohexene hydrocarbon to a cyclohexane hydrocarbon, dehydrogenating said cyclohexane hydrocarbon to a benzene hydrocarbon and hydrogen, and utilizing at least a portion of said hydrogen in the hydrogenation of said cyclohexene hydrocarbon.

8. A process for producing a benzene hydrocarbon which comprises reacting a mono-olefinic hydrocarbon and a glycol containing at least 4 carbon atoms per molecule in the presence of an acid-acting catalyst to produce a cyclohexene hydrocarbon and dehydrogenating said cyclohexene hydrocarbon to a benzene hydrocarbon.

HERMAN PINES.
VLADIMIR N. IPATIEFF.